United States Patent [19]

Ughi

[11] 4,214,335
[45] Jul. 29, 1980

[54] METHOD FOR MAKING SOLES

[76] Inventor: Edoardo Ughi, Via Plinio, 4, Lecco, Italy

[21] Appl. No.: 9,524

[22] Filed: Feb. 5, 1979

[30] Foreign Application Priority Data

Apr. 28, 1978 [IT] Italy .............................. 22856 A/78

[51] Int. Cl.² ...................... A43D 25/00; A43B 13/28
[52] U.S. Cl. .............................. 12/146 BR; 12/147 B; 36/24.5
[58] Field of Search ........... 12/146 R, 146 B, 146 BP, 12/146 BR, 147 R, 147 A, 147 B; 36/24.5

[56] References Cited

U.S. PATENT DOCUMENTS

| | | | |
|---|---|---|---|
| 42,423 | 4/1864 | Ware | 12/146 BR |
| 2,083,376 | 6/1937 | Heilhecker | 12/146 BR |
| 2,912,771 | 11/1959 | Harrison | 36/24.5 |

*Primary Examiner*—Patrick D. Lawson
*Attorney, Agent, or Firm*—Bucknam and Archer

[57] ABSTRACT

An improved method for making soles provided with high heel, for women shoes, in a single piece, is described which consists of injection molding thermoplastics materials in a mould formed by several complementary portions defining therebetween the cavity of the sole heel. Prior to the injection molding, a sheet material for laterally and rearwardly covering the heel and a stiffening core or rigid structure are inserted. The rigid structure is provided with a downwardly vertical direction concavely curved front wall and, at its front face, with two continuous side fins projecting for a length equal to the thickness of the covering sheet material and, at its base with slots and at least two blind holes effective to fix the heel top-piece. The rigid structure is provided, at its upper surface, with a hole which as it is filled up by the plastics material, contributes to improve the anchoring of the rigid structure to the sole. The heel top-piece is provided with slots perfectly mating with the rigid structure slots. Between the side fins of the rigid structure and the strip of the covering material a gap is formed which is filled by the thermoplastics material.

6 Claims, 13 Drawing Figures

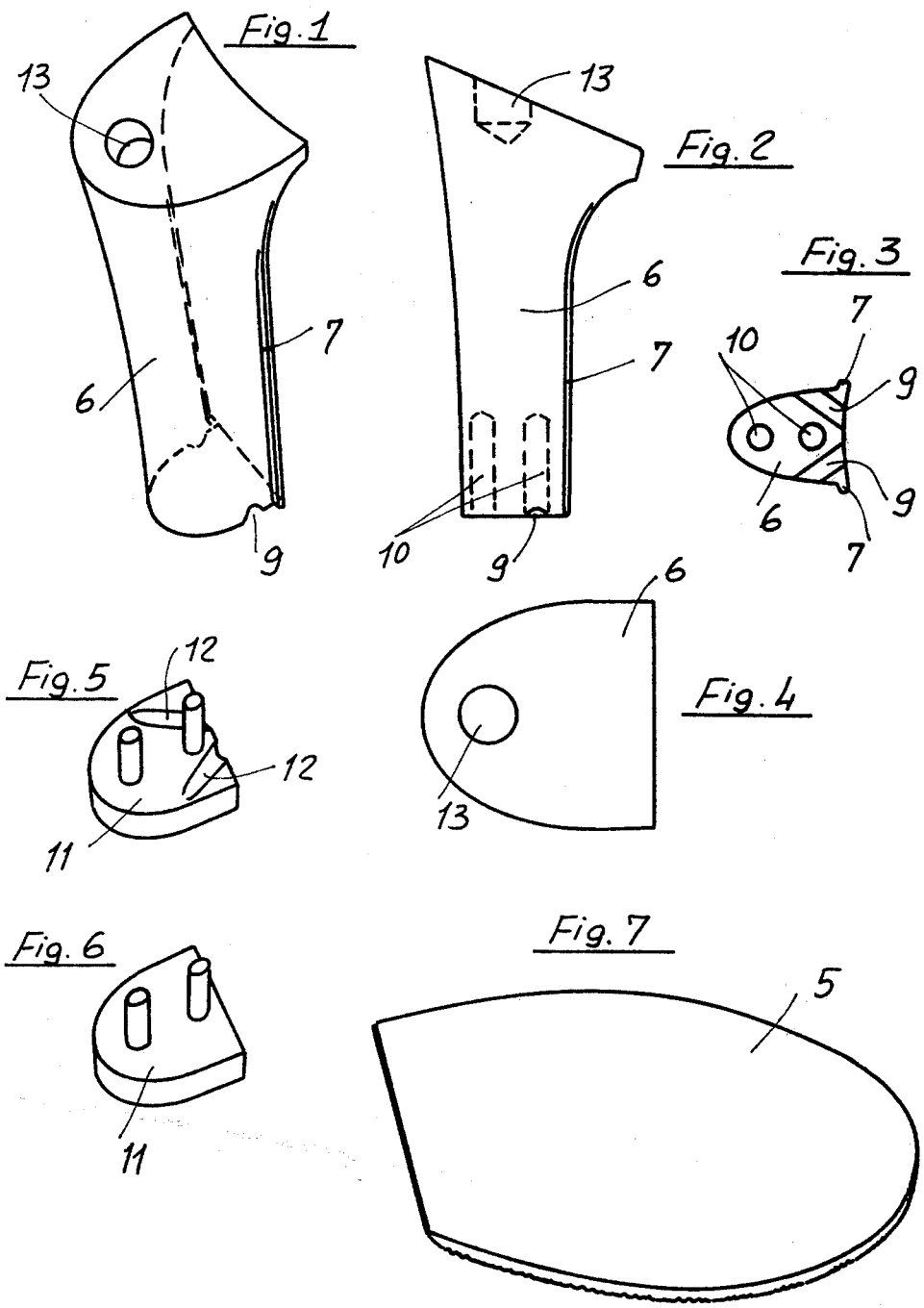

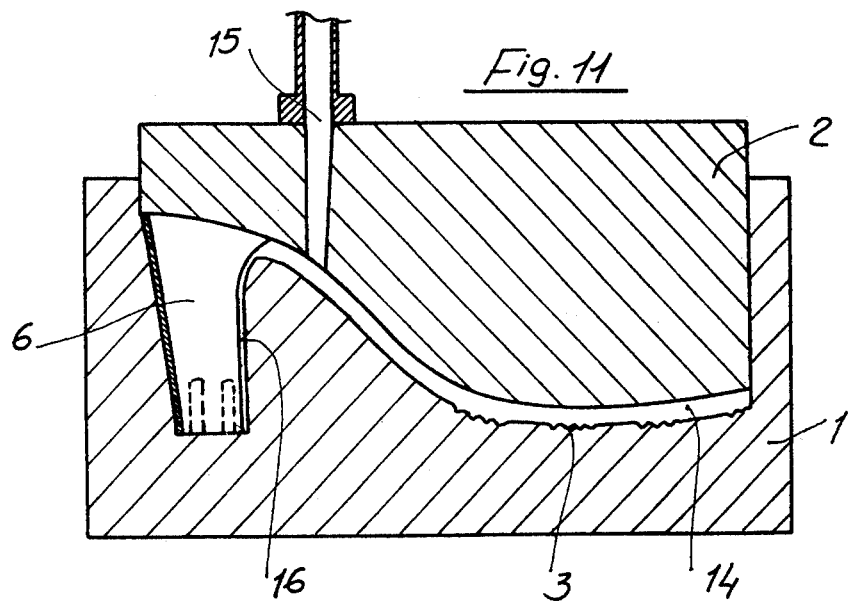
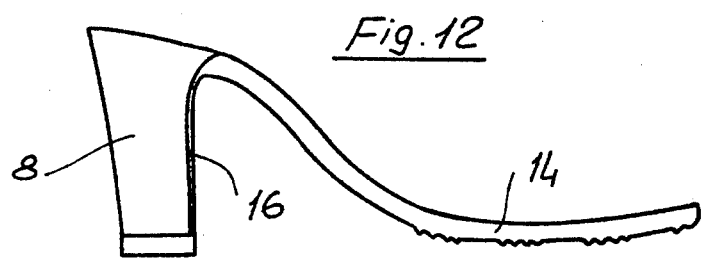
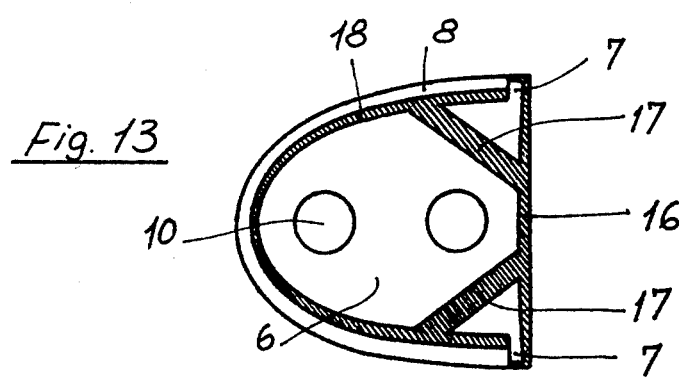

METHOD FOR MAKING SOLES

The present invention relates to an improved method for making soles for women footwears or shoes provided with a high heel and it also relates to the high-heel soles obtained by the method.

It is known to produce soles with corresponding heels in a single piece by injection molding plastics materials in a mold formed by several complementary portions cooperating to define therebetween the recess for the forming of the heel and sole.

The sole with its corresponding heel is obtained by a single operation, in which there are formed both the sole and the high heel rigid therewith.

Moreover the heel is generally provided with an outer covering, such as of skin, synthetic skin, wood, plastics laminate and the like, effective to finish the heel itself without requesting further finishing operations.

To this end, in the recess of the mold, which has to form the heel, a covering material portion is inserted, said portion being suitably shaped to laterally, rearwardly and optionally frontwardly cover the heel.

Furthermore, in the heel recess, a stiffening core or rigid structure is located which may consist of wood, premolded plastics material, metal or other suitable material which lowerly ends with a hole for the fixing of the heel top-piece.

The main drawback of this making method is that it is practically difficult to obtain a precise locating of the covering material portions on the heel walls.

The applicant has found, and this discovery pertains to the present invention, that the aforesaid drawback is eliminated by using a heel-shaped stiffening core or rigid structure, said stiffening core or rigid structure being provided at the front face thereof, with two continuous side fins projecting for a distance or length equal to the covering material thickness.

In fact, said fins act as stop abutments and allow for a perfect locating of the covering material on the rear side heel surface to be obtained.

On the contrary, the front surface of the heel is covered by that same synthetic material forming the sole, thereby providing a single body therewith, and forming a false connecting breast.

To this end, the stiffening core is provided with a front concave surface, in a downwardly vertical direction, effective to aid the downwardly sliding of the injected material and effective to provide said false breast with a suitable consistence.

At the base portion of said rigid structure slots are provided thereinto the injected material inserts thereby forming a single piece with the connecting false breast.

Moreover said rigid structure is provided with at least two blind holes, at the lower portion thereof, for the applying of the heel top-piece and with a hollow or recess, at the upper portion thereof to improve the fixing to the sole.

In particular, the heel top-piece may be applied to the rigid structure before the forming of the sole.

In this case, said heel top-piece too is provided with slots, as formed near the slots at the base of the rigid structure.

Furthermore, according to the instant improved method it is possible to predispose, in the forming mould, at the sole resting surface, a preformed and shaped foot-sole, as provided with a surface grooved pattern.

This foot-sole may be made of natural or synthetic rubber or of a polyurethane or other suitable mixtures having proper wear-resistance and anti slid characteristics.

In order to better understand the functional and operative characteristics and the concept of the present invention, the improved method for making high-heel soles for women shoes according to the present invention will be thereinbelow described with reference to the figures of the accompanying drawings relating to an exemplificative and not limitative embodiment thereof, and where:

FIG. 1 is a perspective view of the rigid structure;

FIG. 2 is a side view of the rigid structure of FIG. 1;

FIGS. 3 and 4 show respectively the lower and upper faces of the rigid structure of the preceding figures;

FIGS. 5 and 6 illustrate the two possible forms for the heel top-piece, either provided or not with slots;

FIG. 7 illustrates a preformed foot-sole effective to be inserted in the mould;

FIG. 11 illustrates the cross-section of the mold in a completely assembled condition;

FIG. 12 illustrates the sole with corresponding heel as obtained by the mould illustrated in FIG. 11, and FIG. 13 illustrates a perspective view of the heel lower face or surface.

Figure 9:
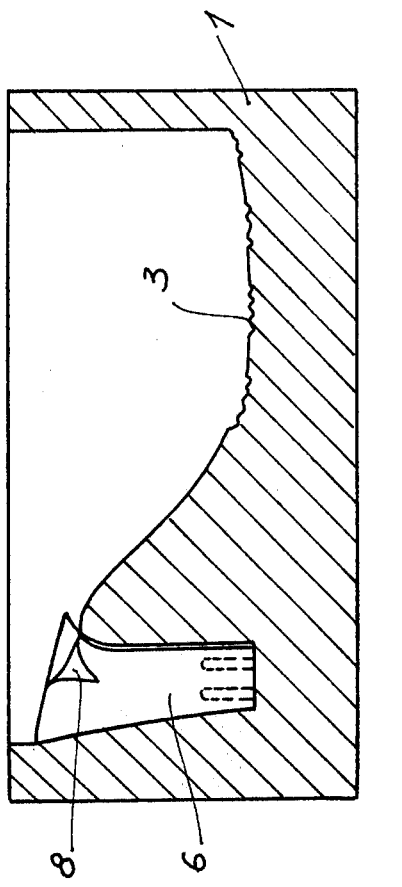
FIG. 9 shows the cross-section of the lower mold portion, thereinto is inserted the heel rigid reinforcing structure with the related covering.
Figure 10:
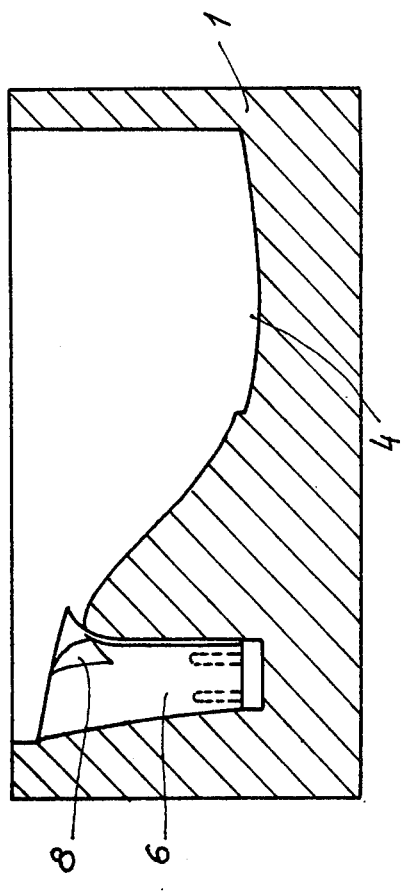
FIG. 10 is like FIG. 9 with the exception that it is herein shown the preformed foot-sole of FIG. 7.
Figure 8:
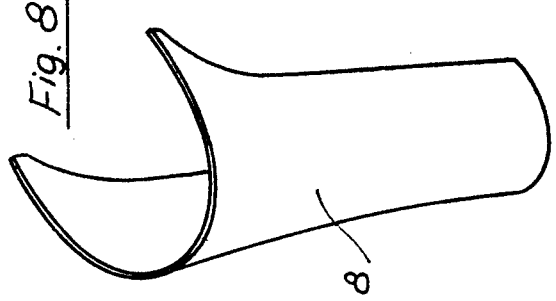
FIG. 8 shows the sheet material for laterally and rearwardly covering the heel.

Referring to the figures of the accompanying drawings, the sole with heel according to the present invention may be obtained by molding a single structure, by using a mould formed by a lower portion (1) and an upper portion (2) complementary to one another, which together define therebetween a hollow or recess corresponding to the thickness and optionally to the surface grooved pattern (3) of the sole to be obtained and to the heel.

The mould lower portion (1) may be provided, on the upper surface thereof, with a seat (4) thereinto is inserted, before the forming, a preformed foot-sole (5) having particular functional characteristics.

In the heel cavity or recess of the lower portion (1) of the mould, a rigid structure (6) is inserted, said rigid structure having the same shape of the heel.

Said rigid structure (6) or insert, is provided, at the front face thereof, with two continuous side fins (7) projecting for a length equal to the thickness of the sheet material strip or band (8) rearwardly and laterally covering the heel.

Between said side fins (7) and the strip (8) a narrow gap is formed, this latter being filled by the thermoplastics material as injected in the mould cavity and forming the sole.

Moreover said rigid structure (6) is provided with a front wall which is slightly concavely-curved in a downwardly vertical direction in order to aid the downwardly flowing of the plastics material.

Furthermore said rigid structure (6) is provided, at the base thereof, with slots (9) and at least two blind hole (10) for the fixing of the heel top-piece (11).

The heel top-piece (11) may be fixed to the structure (6) before or after the forming of the sole (14) in the mould.

In the first case, the heel top-piece (11) is also preferably provided with slots (12) exactly mating with the solts (9) provided at the base of the aforesaid structure (6).

Furthermore, said structure (6) is provided, at the upper portion thereof, with a hole, or recess (13) which, due to the fact that it is filled up by plastics material during the injection, improves the anchoring of said structure (6) to the sole (14).

The sole (14) is obtained by injecting in the mold through the hole (15) located at any suitable place, any known thermoplastics type of material.

In order to obtain the sole with corresponding heel according to the present invention, in the heel cavity or recess is inserted the sheet material (8) thereby laterally and rearwardly covering said cavity.

Then in the heel cavity or recess is located the rigid structure (6) and said thermoplastics material is injected in the closed mold through the hole (15).

The particular concavity of the rear wall of the rigid structure (6) aids the flowing of the thermoplastics material in the base slots (9) and in the slots (12) of the heel top portion thereby providing a monolythic projection or extension (16) forming a single piece with the sole (14).

The thermoplastics material extension (16) is firmly anchored to the heel and, optionally, to the heel top piece (11) by means of cords or ribs (17), of plastics material, formed at said slots.

Moreover, said cords (17) are further anchored to the heel by means of the plastics material, which, during the injection step, inserts into the gap (18) delimitated by the rigid structure (6) and the covering material (8).

From the above description and the examination of the figures of the accompanying drawings, the instant method carrying out facility and the remarkable practical, economical and functional advantages characterizing the sole with heel, particularly suitable for women shoes obtained by said method, are self evident.

Obviously in the actual practicing of the improved method for making soles for high heel shoes according to the present invention, several variations and modifications may be carried out falling within the inventive concept and without departing from the scope thereof.

I claim:

1. An improved method for making soles provided with high heel, for women shoes, in a single piece, by injection molding thermoplastics materials in a mould formed by several complementary portions defining therebetween the cavity of the sole heel, wherein in the heel cavity, before the injection, are inserted a sheet material for laterally and rearwardly covering the heel and a stiffening core or rigid structure, characterized in that said rigid structure is provided with a downwardly vertical direction concavely curved front wall and, at the front face thereof, with two continous side fins projecting for a length equal to the covering sheet material thickness and, at the base thereof, with slots and at least two blind holes effective to fix the heel top-piece.

2. An improved method according to claim 1, characterized in that said rigid structure is provided, at the upper surface thereof, with a hole or hollow which, as filled up by said plastics material, is effective to improve the anchoring of said rigid structure to the sole.

3. An improved method according to claims 1 or 2, characterized in that the heel top-piece is provided with slots perfectly mating with said rigid structure slots.

4. An improved method according to claim 1, characterized in that between the side fins of the rigid structure and the strip of the covering material a gap is formed filled by said thermoplastics material.

5. An improved method according to claim 1 characterized in that said injected thermoplastics material forms a monolytic extension between the slots, the gap and sole.

6. An improved method according to claim 1, characterized in that in the forming mould, at the resting surfaces of the sole, a preformed foot-sole is located as provided with a surface grooved pattern.

* * * * *